(No Model.)

G. M. BURGESS.
APPARATUS FOR ASSEMBLING SPINDLE BLADES AND WHIRLS.

No. 570,375. Patented Oct. 27, 1896.

Witnesses:
Edward F. Allen.
A. C. Harmon.

Inventor:
George M. Burgess
by Crosby Gregory attys.

UNITED STATES PATENT OFFICE.

GEORGE M. BURGESS, OF HOPEDALE, MASSACHUSETTS, ASSIGNOR TO THE HOPEDALE MACHINE COMPANY, OF SAME PLACE.

APPARATUS FOR ASSEMBLING SPINDLE-BLADES AND WHIRLS.

SPECIFICATION forming part of Letters Patent No. 570,375, dated October 27, 1896.

Application filed August 1, 1896. Serial No. 601,347. (No model.)

*To all whom it may concern:*

Be it known that I, GEORGE M. BURGESS, of Hopedale, county of Worcester, State of Massachusetts, have invented an Improvement in Apparatus for Assembling Spindle-Blades and Whirls, of which the following description, in connection with the accompanying drawings, is a specification, like letters on the drawings representing like parts.

Spinning-spindles are commonly made in two parts, the blade and the sleeve-whirl, and in assembling the two parts the whirl is forced onto the blade.

Heretofore considerable difficulty has been experienced in assembling the parts so that the blade and whirl shall be truly concentric, for as the sleeve-whirl is made of cast-iron it can be easily crowded onto the blade in such manner as to be out of center or eccentric thereto.

This invention has for its object the production of a strong and simple apparatus for assembling spindle-blades and their sleeve-whirls so that they shall always be truly concentric, means being also provided for insuring the position of the sleeve-whirl at a fixed point between the ends of the blade for every spindle of the same size.

Figure 1:
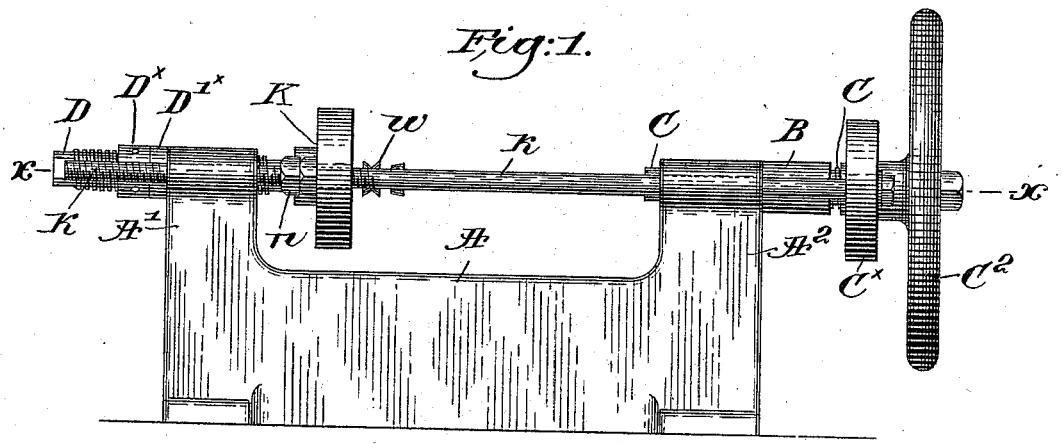
Figure 2:
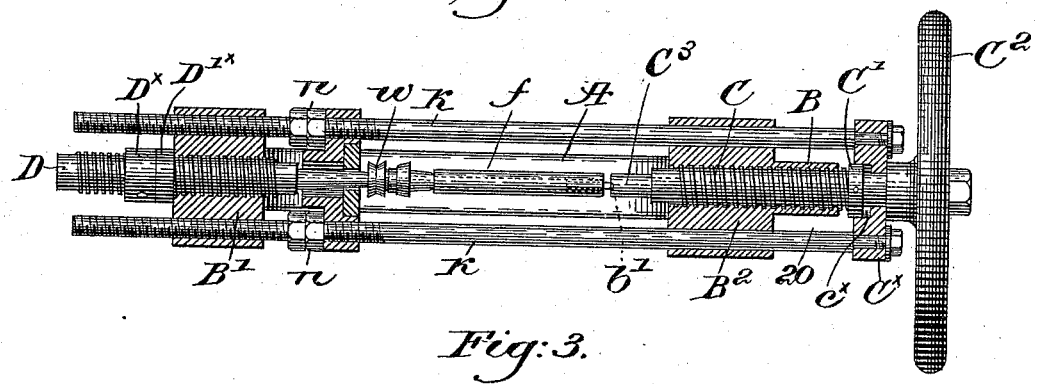

Figure 1 in side elevation represents an apparatus embodying my invention. Fig. 2 is a partial longitudinal section taken on the line $x$ $x$, Fig. 1; and Fig. 3 is an enlarged similar sectional view of the left-hand end of the apparatus shown in Figs. 1 and 2, the sleeve-whirl and its holder being also in section.

The main frame is shown as a casting A to form a strong and rigid support for the operative parts, upturned at its ends at A' and $A^2$ to form internally-threaded bearings B' and $B^2$ in alinement with each other, the latter bearing being preferably extended outwardly, as at B. A threaded presser-spindle C engages the threaded bearing B $B^2$, Fig. 2, and its inner end carries a rotatable stud $C^3$, preferably slightly cupped out or recessed to receive the tip $b'$ of the spindle-blade $b$, the spindle C having an annular flange or collar C' thereon beyond the outer end of the bearing, and a hand-wheel $C^2$, by which the spindle is rotated to move it longitudinally in its bearing. A collar $C^\times$ is loosely mounted on an unthreaded part of the presser C, between the enlargement C' and the hand-wheel, and recessed on its inner face at $c^\times$ to receive said enlargement, the depth of the recess being sufficient to permit a certain amount of relative longitudinal movement of the presser C and collar $C^\times$.

The threaded bearing B' receives a threaded stud D, held firmly in adjusted position by suitable check-nuts $D^\times$ $D'^\times$, screwed onto its outer end and resting against the bearing, the inner end of the stud having a preferably-tapering recess to receive the correspondingly-shaped shank $h'$ of the sleeve-whirl holder $h$, thus presenting an extended support for and to maintain the holder in axial alinement and to take up the end thrust thereof.

Figure 3:
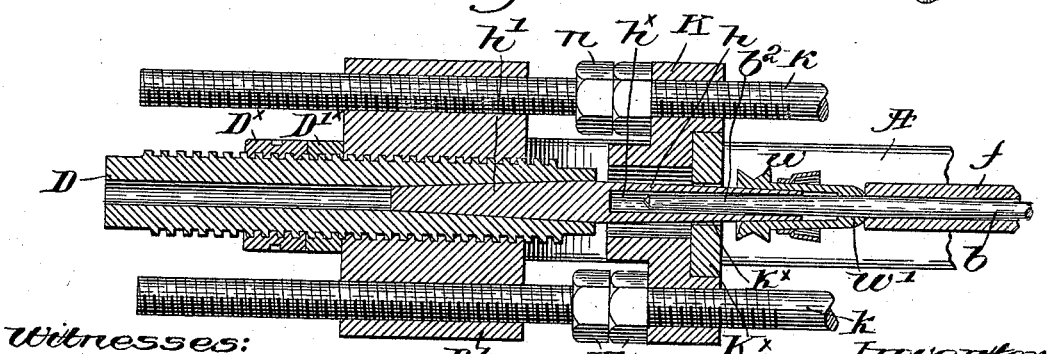

As best shown in Fig. 3, the holder $h$ has a tapering hollow inner end $h^\times$, which fits the tapering bore of the sleeve-whirl $w$, placed by the operative on the holder, and the tapering end or pintle $b^2$ of the spindle-blade $b$ is passed loosely through the part $w'$ of the whirl, the pintle extending into the hollow portion $h^\times$ of the holder.

A strong sleeve $f$ is placed on the spindle-blade between its tip $b'$ and the sleeve-whirl, (see Fig. 2,) and pressure is then brought to bear on the blade in the direction of its length.

By rotation of the hand-wheel $C^2$ the spindle C is moved longitudinally to the left, Fig. 2, thereby forcing the blade $b$ into the whirl $w$ until the stud $C^3$ engages one end of the collar or sleeve $f$, its other end bearing against the top $w'$ of the whirl, after which no further relative movement of the blade and whirl can be effected.

As the presser C is rotatable relatively to the stud $C^3$, the spindle-blade is not subjected to any torsional strain when under pressure. The position of the whirl upon the blade is thus limited by the length of the sleeve $f$, the latter also preventing any tendency of the blade to get out of line when under pressure, and furthermore the stud on the presser C holds the blade in absolutely central position relatively to the opening in the whirl.

I have provided means for removing the assembled spindle-blade and whirl from the whirl-holder by reverse movement of the hand-wheel C².

Parallel rods $k\ k$ are extended loosely through holes in the bearings B' B², and are securely attached at one end to the loose collar C$^\times$, while a cross-head K, having a hole $k^\times$ to receive the whirl-holder $h$, is held in adjusted position on the rods $k\ k$ by suitable check-nuts $n\ n$ on the threaded ends of the rods. The cross-head is recessed to receive a stripper K$^\times$, preferably of hardened steel, also perforated to receive the holder, the hole in the stripper being smaller than the diameter of the sleeve-whirl.

Referring now more particularly to Fig. 2, and supposing that the blade $b$ has been firmly pressed into the whirl $w$, reverse rotation of the hand-wheel C² withdraws the presser C until the flange or collar C' suddenly strikes the bottom of the recess $c^\times$ in the loose collar C$^\times$ and moves it to the right, Fig. 2, as the longitudinal movement of the presser-spindle C is continued. The rods $k\ k$ transmit the movement to the cross-head K and stripper K$^\times$, the latter being brought smartly against the under side of the sleeve-whirl and thereby removing it from the holder $h$. The operative then pulls the assembled blade and sleeve-whirl from the holder $h$, and when the enlargement C' on the presser C abuts against the extension B the longitudinal movement of said presser is absolutely and positively stopped.

My invention is not restricted to the precise construction and arrangement herein shown and described, as the same may be modified or rearranged without departing from the spirit and scope of my invention.

Having fully described my invention, what I claim, and desire to secure by Letters Patent, is—

1. In an apparatus of the class described, a hollow, externally-tapering holder for the whirl and to receive the spindle-blade loosely, a presser movable in the axial line of said holder, to engage and press the blade into the whirl, and means to limit the relative movement of the spindle-blade and whirl, substantially as described.

2. In an apparatus of the class described, a hollow, tapering holder for and to center the sleeve-whirl, a presser to engage the tip of the spindle-blade and force the latter into the whirl, and a sleeve to loosely surround the blade between the whirl and presser, to fix the position of the whirl on the blade and prevent deflection of the latter, substantially as described.

3. In an apparatus of the class described, a centering-holder for the sleeve-whirl, a support for the tip of the spindle-blade, in axial alinement with the holder, means to cause relative longitudinal movement of the blade and whirl, to rigidly secure them together, and a stripper to release the whirl from the holder, substantially as described.

4. In an apparatus of the class described, a centering-holder for the sleeve-whirl, means to adjust it, a longitudinally-movable presser in axial alinement with the holder, to engage the spindle-blade and force it into the whirl, and a stripper, controlled by retractive movement of the presser, to release the whirl and its attached blade from the holder, substantially as described.

In testimony whereof I have signed my name to this specification in the presence of two subscribing witnesses.

GEORGE M. BURGESS.

Witnesses:
GEORGE OTIS DRAPER,
B. M. AYRES.